United States Patent
Shen et al.

(10) Patent No.: US 10,287,216 B2
(45) Date of Patent: May 14, 2019

(54) METHOD FOR DIRECTLY PREPARING A FERTILIZER BY USING STRAWS AND PREPARED STRAW ORGANIC FERTILIZER

(71) Applicant: NANJING AGRICULTURAL UNIVERSITY, Nanjing, Jiangsu (CN)

(72) Inventors: Qirong Shen, Nanjing (CN); Qiwei Huang, Nanjing (CN); Rong Li, Nanjing (CN)

(73) Assignee: NANJING AGRICULTURAL UNIVERSITY, Nanjing (CN)

( * ) Notice: Subject to any disclaimer, the term of this patent is extended or adjusted under 35 U.S.C. 154(b) by 37 days.

(21) Appl. No.: 15/452,093

(22) Filed: Mar. 7, 2017

(65) Prior Publication Data

US 2017/0260109 A1    Sep. 14, 2017

(30) Foreign Application Priority Data

Mar. 9, 2016 (CN) .......................... 2016 1 0131358

(51) Int. Cl.
   *C05B 7/00* (2006.01)
   *C05F 17/00* (2006.01)

(52) U.S. Cl.
   CPC ............ *C05F 17/0036* (2013.01); *C05B 7/00* (2013.01); *Y02W 30/43* (2015.05)

(58) Field of Classification Search
   CPC ....... C05F 17/0036; C05B 7/00; Y02W 30/43
   See application file for complete search history.

(56) References Cited

U.S. PATENT DOCUMENTS

2012/0325421 A1* 12/2012 Li .............................. C05F 7/02
                                                      162/189

FOREIGN PATENT DOCUMENTS

| CN | 1569764   | A |   | 1/2005  |
|----|-----------|---|---|---------|
| CN | 101696391 | A |   | 4/2010  |
| CN | 101798243 | A | * | 8/2010  |
| CN | 103468592 | A |   | 12/2013 |
| CN | 103739314 | A |   | 4/2014  |
| CN | 103804032 | A | * | 5/2014  |
| CN | 104803723 | A | * | 7/2015  |
| JP | S5551789  | A |   | 4/1990  |

* cited by examiner

*Primary Examiner* — Jennifer A Smith
(74) *Attorney, Agent, or Firm* — Oliff PLC

(57) ABSTRACT

A method for preparing a fertilizer using straws and prepared straw organic fertilizer; the method includes: composting straws, spraying a compositing microbial solution containing amino acids to start decomposition of straws, and adjusting humidity of a straw compost, times of spraying a solution of product nutrients, component of the solution to obtain an up-to-standard commercial straw organic fertilizer; and keeping the composting temperature about 70° C. for long time by adjusting the turning time of the straw compost and collocation time of spraying the solution. The method is based on rich organic matters and nutrients in straws, and need for organic fertilization by soil and the like, and by improving the nutrition condition and growing condition of microorganisms of the straw compost, crop straws are directly prepared into high-quality commercial organic fertilizer in short time, so crop straws are completely utilized, and high-quality commercial organic fertilizer product is provided for fertilization.

13 Claims, No Drawings

METHOD FOR DIRECTLY PREPARING A FERTILIZER BY USING STRAWS AND PREPARED STRAW ORGANIC FERTILIZER

BACKGROUND

Technical Field

The present invention relates to the technical field of straw composting, and particularly to a method for directly preparing a fertilizer by using straws, and a prepared straw organic fertilizer.

Related Art

About 1.5 billion tons (on the basis of dry matter) of crop straws and residues from cereal crops, vegetables and fruit trees are annually produced in China. These plant materials contain 60-75% of organic matter, 0.6-1% of nitrogen, 0.5-0.7% of phosphorus ($P_2O_5$), 1-1.2% of potassium ($K_2O$), and also a variety of micro-elements essential to plants. If all these crop straws are returned to fields, 20-30% of the chemical nitrogen fertilizer, 40-50% of the chemical phosphorus fertilizer, about 50-60% of the chemical potash fertilizer and 70-80% of the micro-nutrient fertilizer can be saved, and the contents of soil organic matter in China can be significantly increased. It can be seen that the crop straws are a very valuable fertilizer resource, and it is particularly important and urgent to make full use of these straw resources under the strategic situation that the CPC Central Committee and the State Council recently put forward in terms of the double reduction of fertilizers and pesticides.

However, with the rapid development of China's economy and the large transfer of rural labor force, as well as the difficulties in farming and the problems of more serious pests and diseases in the next season crops caused by directly returning the crop straws to the fields, the practice of traditional returning of crop straws directly to the fields becomes more and more unsuitable, considering the current situation in the rural regions and in the agricultural production of China. In the harvesting season for crops, although governments at various levels and in various regions send a large number of persons to crop fields to ban burning of straws, burning of straws on the field sites is still very common, because there is no operable ways of straw use. The problem of straw burning cannot be solved fundamentally only by banning it forcibly.

In the past decade, straw-based power generation becomes very hot, and straw-based power generation plants at various scales are built throughout the country. However, because the straw has a low energy value and generally needs to be sun-dried before being received by the power plant, the storage and sun-drying of the straws greatly increase the cost. These directly lead to a dilemma in which although the straw-based power generation sounds very attractive, the actual operation is very difficult. It is a matter of wasting money and manpower to maintain the straw-based power generation by relying on government subsidies, in which it cannot run long. Therefore, to develop a practical and feasible way of straw resource utilization is a very urgent issue facing the agricultural production in China.

During the process of straw composting, although the straw is rich in organic matter and some nutrients, it is difficult for the composting microorganisms to acquire nutrients suitable for their growth in a short time (24 hours or 48 hours) such that the composting microorganisms can decompose the straw rapidly (the composting temperature rapidly rises to 60° C. in 48 hrs) because of the high C/N ratioin straws. However, if the added composting microbial strains cannot grow rapidly in a short period of time (5-7 days), failure of the microbial strains is caused, which is the frequently occurring insignificant effect of the composting microbes in starting the composting. Therefore, the development of a nutrient formulation with which the straw composting microorganism can start the decomposition of the straw is critical to the success of straw composting. The present inventors find through research that if only the composting microbial solution and water are added, the composting temperature rises quite slowly, and the temperature of the straw compost only reaches 49° C. at day 6, which may lead to the insignificant effect of the composting microbes in starting the composting.

SUMMARY

In view of the disadvantages existing in the prior art, an objective of the present invention is to provide a method for directly preparing a fertilizer by using straws.

Another objective of the present invention is to provide a straw organic fertilizer prepared by using the method.

The objectives of the present invention can be accomplished by means of the technical solutions below.

A method for directly preparing a fertilizer by using straws comprises:

(1) stacking the raw straws after shipping into a straw pile of 5 meters or more in height; performing the first spray by spraying a solution directly on the straws, where the liquid volume in the first spray is controlled to such an extent that an aqueous solution flows out from the bottom of the pile; performing the second spray when the temperature of the pile reaches 70° C. and continues for 3-5 days; performing the third spray after 3-5 days of high temperature composting after the second spray; and spraying once every 3 to 5 days hereafter, so that a straw compost is prepared after 6-7 operations as such, where the liquid volume in the second and later sprays is controlled to such an extent that the water content in the pile reaches 55-60%, and no more aqueous solution flows out from the bottom of the pile.

The solution in the first spray is a solution formed by mixing a compositing microbial solution with an aqueous amino acid solution (free amino acids content being 10% in W/V) at a volume ratio of 9:1

The solution in the second spray is a solution formed by adding, to the solution of the first spray, ammonium sulfate of 1-5% (W/V) based on the volume of the spray solution.

The solution in the third and later sprays is 1-3% (W/V) aqueous ammonium sulfate solution+1% (W/V) aqueous potassium dihydrogen phosphate solution, in which the volume ratio (V/V) of the aqueous ammonium sulfate solution to the aqueous potassium dihydrogen phosphate solution is 1:1

Any strains that can be used for composting the straws through fermentation are useful in the methods of the present invention. In a preferred embodiment of the present invention, the composting microbe used in the present invention is NJZ5, deposited in China General Microbiological Culture Collection Center (CGMCC) under CGMCC Accession No. 3309 on Sep. 22, 2009. The strain is patented (Patent No. ZL2009102335776). In the compositing microbial solution, the culturable number of colonies (spores+mycelia) of NJZ5 is greater than or equal to $1 \times 10^9$ colonies/ml. The preparation of the compositing microbial solution is detailed in Granted Specification, Paragraphs [0041]-[0042] of ZL2009102335776.

In a preferred embodiment of the present invention, the aqueous amino acid solution of the present invention is prepared by acidolysis by adding sulfuric acid to the lean meat of pigs died of illness, in which the acidolysis comprises hydrolyzing the lean meat at 80-90° C. for 5-7 hrs with sulfuric acid having a concentration of 5-7 mol/L, and the material ratio of the lean meat to the 5-7 mol/L sulfuric acid is 1:1.5-2.5. The amino acid content in the aqueous amino acid solution is about 10%.

In a preferred embodiment of the present invention, when the temperature of the pile reaches 70° C. and continues for 3-5 days after the first spray, the first turning is performed and then the second spray of the compositing solution is performed immediately after the turning such that the water content in the compositing material reaches 55-60%, upon which the composting temperature is 45-55° C., the pile temperature rises to 70° C. or higher again after 24 hrs and continues for 3-5 days, and then the second turning and the third spray of the compositing solution are performed, so that the straw compost is prepared after 6-7 operations as such.

In a preferred embodiment of the present invention, on the basis of the above steps, the turning is performed once every 3 to 8 days, and the spray is performed immediately after the turning, during the preparation of the compost.

In a further preferred embodiment of the present invention, the turning is performed once every 5 days and the spray is performed immediately after the turning, during the preparation of the compost.

In the method according to the present invention, upon turning, the compositing material is exposed to the oxygen fully by bringing it into contact with the air for a period of time as long as possible.

In the method according to the present invention, after the first spray, the liquid flowing out from the bottom of the pile is totally collected and recovered, and re-used in the second spray.

A straw organic fertilizer prepared according to any of the methods provided in the present invention is also provided.

The creative points of the present invention include the following:

(1) A nutrient formulation to stimulate the growth of straw composting microorganisms is invented.

Considering the insignificant effect of the composting microbes in starting the composting, it is found in the present invention that in the first spray, when the composting microbes and an amino acid-containing liquid are added at the same time, the composting temperature rises more quickly than when ammonium sulfate is added. For example, the compost added with amino acids enters a high-temperature stage (≥60° C.) after 48 hrs. At this time, the treatment added with ammonium sulfate still has a composting temperature of only 30° C. plus, and the compost in the treatment added with ammonium sulfate enters a high-temperature stage (60° C. or higher) only after 6 days (144 hrs) of composting. Since the amount of amino acids added has no obvious influence on the rising rate of the composting temperature, the amount of the aqueous amino acid solution added is determined to be about 10%, considering the cost of the amino acids.

TABLE 1

Change in composting temperature after the composting microorganism solution added with different nutrients is sprayed on the straws

| Nutrient ingredient | Composting temperature at various time(° C.) | | | | | |
| --- | --- | --- | --- | --- | --- | --- |
| | 24 h | 48 h | 72 h | 96 h | 120 h | 144 h |
| Microbial solution + water | 26 | 31 | 38 | 42 | 47 | 49 |
| Microbial solution + aqueous ammonium sulfate solution [0.1%(g/100 ml)] | 28 | 33 | 38 | 46 | 57 | 63 |
| Microbial solution + aqueous ammonium sulfate solution [0.5%(g/100 ml)] | 30 | 36 | 41 | 50 | 59 | 65 |
| Microbial solution + aqueous ammonium sulfate solution [1.0%(g/100 ml)] | 29 | 35 | 42 | 51 | 48 | 66 |
| Microbial solution + aqueous amino acid solution [10%(V/V)] | 49 | 60 | 69 | 73 | 75 | 74 |
| Microbial solution + aqueous amino acid solution [20%(V/V)] | 50 | 62 | 69 | 74 | 75 | 75 |
| Microbial solution + aqueous amino acid solution [30%(V/V)] | 52 | 63 | 70 | 75 | 76 | 75 |

Note:
the nitrogen content in ammonium sulfate (solid) is 21%, and the nitrogen content in the amino acid solution is 1.3%.

(2) The times of spraying a solution for adjusting the humidity of a straw compost and the product nutrients and the composition of the solution are invented.

As is completely different from the composting of livestock and poultry manure, the second important factor for ensuring the ongoing of the high-temperature composting of straws is to maintain the humidity of the straw compost. In the composting of straws by the present method, the straws have no need to be powdered. Instead the raw straws after shipping are stacked into a straw pile of 5 meters or more in height (to save the composting area), and then the formulated compositing microbial solution for straws and the aqueous amino acid solution are directly sprayed on the straws. The liquid volume in the first spray is controlled to such an extent that an aqueous solution flows out from the bottom of the pile. The liquid flowing out from the bottom of the pile is totally collected and recovered, and re-used in the second spray. The second spray is performed at a time when the water content in the pile is less than 40% and that is generally about 4-5 days after composting. The liquid volume in the second spray is controlled to such an extent that the water content in the pile suitably reaches 55-60%, and no more aqueous solution flows out from the bottom of the pile. At the time of the second spray, the compost has entered a high-temperature stage, and the straws with a high C/N ratio are being decomposed by the microorganisms. On the basis of the composition of the first spray solution, an amount of ammonium sulfate is added, which can not only maintain the high-temperature decomposition time of the compost, but also increase the ability of organic nitrogen assimilation of the compost, thereby improving the compost quality (see Table 2). The solution in the third and later sprays does not need to contain microbes and amino acids, and 1-3% (W/V) ammonium sulfate and 1% (W/V) potassium dihydrogen phosphate buffer in water can work well. In a later stage of composting, 1% (W/V) of potassium dihydrogen phosphate buffer is sprayed for the purpose of stabilizing the pH of the pile so that it does not exceed 8, thus avoiding the volatilization of ammonia from the pile, and also for the purpose of increasing the phosphorus and potassium content in the compost. It can be seen from Table 2 that 1-3% (W/V)ammonium sulfate and 1% (W/V) potassium dihydrogen phosphate buffer are added from the third spray of the liquid (Treatment No. 5), and an up-to-standard commercial straw organic fertilizer can be obtained after 1-month composting as such. In the Treatment No. 5, the nutrients nitrogen, phosphorous, and potassium reach 5.9% (Table 2), which greatly exceeds the national standard (5%) in commercial organic fertilizer industry.

TABLE 2

Quality of organic fertilizer products obtained with different treatments (1-month composting)

| Treatment No. | Organic matter (g/kg) | Total nitrogen (g/kg) | Total phosphorous $P_2O_5$ (g/kg) | Total potassium $K_2O$ (g/kg) |
|---|---|---|---|---|
| 1 | 55.2 | 1.2 | 1.0 | 1.9 |
| 2 | 48.9 | 1.4 | 1.1 | 2.0 |
| 3 | 48.1 | 1.7 | 1.1 | 2.0 |
| 4 | 47.8 | 2.0 | 1.2 | 2.2 |
| 5 | 47.2 | 2.2 | 1.3 | 2.4 |

Note:
Treatment No. 1: microbial solution + water in the first spray, microbial solution + water in the second spray, and water in the third and later sprays
Treatment No. 2: microbial solution + aqueous amino acid solution in the first spray, microbial solution + amino acids + 1-5% aqueous ammonium sulfate solution in the second spray, and water in the third and later sprays
Treatment No. 3: microbial solution + aqueous amino acid solution in the first spray, microbial solution + aqueous amino acid solution + 1-5% aqueous ammonium sulfate solution in the second spray, 1-3% aqueous ammonium sulfate solution in the third spray, and water in the fourth and fifth sprays
Treatment No. 4: microbial solution + aqueous amino acid solution in the first spray, microbial solution + aqueous amino acid solution + 1-5% aqueous ammonium sulfate solution in the second spray, 1-3% aqueous ammonium sulfate solution in the third spray, 1-3% aqueous ammonium sulfate solution + 1% potassium dihydrogen phosphate buffer in the fourth spray, and water in the fifth spray
Treatment No. 5: microbial solution + aqueous amino acid solution in the first spray, microbial solution + aqueous amino acid solution + 1-5% aqueous ammonium sulfate solution in the second spray, 1-3% aqueous ammonium sulfate solution in the third spray, 1-3% aqueous ammonium sulfate solution + 1% potassium dihydrogen phosphate buffer in the fourth spray, and 1-3% aqueous ammonium sulfate solution + 1% potassium dihydrogen phosphate buffer in the fifth spray (3) The turning time of the straw compost and the collocation time of spraying the solution are invented The pile of the straw compost is high, and generally turned by using a dump truck for oxygen exposure. The turning time is dependent on the temperature of the pile. When the pile temperature reaches 70° C. and continues for 3-4 days, turning is needed. Upon turning, the composting material is exposed to the oxygen fully by bringing it into contact with the air for a period of time as long as possible. After turning, the second spray of the composting solution is performed immediately such that the water content in the compositing material reaches about 55-60%, upon which the composting temperature is generally about 50° C. The pile temperature rises to 70° C. or higher again (Table 3) after 24 hrs and continues for 3-4 days. Then, the second turning and the third spray of the composting solution are performed, so that the straw compost is prepared after 6-7 operations as such (in a total of about a month). Afterwards, screening and packaging are carried out. It can be seen from Table 3 that in the composting process, if no turning is performed, the pile temperature is seriously affected by insufficient oxygen. Although the temperature in the first 5 days of composting reaches 71° C., it declines quickly (see the treatment without turning in Table 3). Because the high-temperature stage is very short during the whole composting process, the straw decomposition rate is very low and the raw straw is still visible after one month of composting. However, in case of turning every several days, the time during which the pile temperature is maintained at about 70° C. can be as long as 25 days. During the process, almost all the straws are decomposed, and new humus is synthesized. Considering the turning cost, the turning frequency is suitably once every five days.

TABLE 3

Change in temperature (° C.) of the straw piles with various turning times

| Treatment | 5 days of composting | 10 days of composting | 15 days of composting | 20 days of composting | 25 days of composting | 30 days of composting |
|---|---|---|---|---|---|---|
| Without turning | 71 | 63 | 55 | 52 | 49 | 45 |
| One turning/3d | 69 | 72 | 75 | 68 | 69 | 59 |
| One turning/5d | 72 | 73 | 74 | 70 | 68 | 58 |
| One turning/8d | 70 | 68 | 69 | 69 | 66 | 57 |

Note:
all the treatments receive the same spraying solution.

Beneficial Effects:

The method disclosed in the present invention is based on the characteristics of rich organic matters and nutrients in the straws, and the present situations of urgent need for organic fertilization by the soil in China and the like, and by improving the nutrition condition and growing condition of microorganisms of the straw compost, the crop straws are directly prepared into a high-quality commercial organic fertilizer in a short time, so that the crop straws are completely utilized, and a high-quality commercial organic fertilizer product is provided for fertilization of the soil in China.

Biological Material Deposit Information

NJZ5, also named as *Aspergillus fumigatus*, is deposited in China General Microbiological Culture Collection Center (CGMCC) (Institute of Microbiology, Chinese Academy of Sciences, Datun Road, Chaoyang District, Beijing) under CGMCC Accession No. 3309 on Sep. 22, 2009.

DETAILED DESCRIPTION

Example 1

A method for directly preparing a fertilizer by using straws comprised the following steps.

(1) The straws have no need to be powdered. Instead the raw straws after shipping were stacked into a straw pile of 5 meters or more in height, and then the formulated compositing microbial solution for straws and the aqueous amino acid solution were directly sprayed on the straws. The liquid volume in the first spray is controlled to such an extent that an aqueous solution flowed out from the bottom of the pile. The liquid flowing out from the bottom of the pile was totally collected and recovered, and re-used in the second spray. The solution in the first spray was formed by the composting microbial solution+the aqueous amino acid solution accounting for 10% by volume of the microbial solution. In the compositing microbial solution, the culturable number of colonies (spores+mycelia) of NJZ5 was greater than or equal to $1 \times 10^9$ colonies/ml. The composition of the solution in the first spray was 90 ml composting microbial solution+10 ml aqueous amino acid solution.

(2) When the temperature of the pile reached 70° C. and continued for 3-5 days after the first spray, turning was needed. Upon turning, the composting material was exposed to the oxygen fully by bringing it into contact with the air for a period of time as long as possible. After turning, the second spray of the composting solution was performed immediately such that the water content in the compositing material reached 55-60%. At this time, the compositing temperature was about 50° C. The solution in the second spray was a solution formed by adding, to the solution of the first spray, ammonium sulfate of 3% (g/100 ml) based on the volume of the spray solution.

(3) 24 hrs after the second spray, the pile temperature rose to 70° C. or higher, and continued for 3-5 days. Then the second turning and the third spray of the composting solution were performed. The solution in the third and later sprays was 1% (g/100 ml) aqueous ammonium sulfate solution+1% (g/100 ml) aqueous potassium dihydrogen phosphate solution. The volume ratio of the aqueous ammonium sulfate solution to the aqueous potassium dihydrogen phosphate solution was 1:1. The straw compost was prepared after 6-7 operations as such (in a total of about a month). The product meets the "organic fertilizer standard (NY525-2012)", and fertility parameters are as follows:

TABLE 4

| Item | Index |
| --- | --- |
| Mass percentages of organic matter (on the basis of dry matter), % | 50 |
| Mass percentages of total nutrients (nitrogen + phosphorus pentoxide + potassium oxide) (on the basis of dry matter), % | 6 |
| Mass percentages of water (fresh), % | 20 |
| pH value | 6.3 |

What is claimed is:

1. A method for directly preparing a fertilizer by using straw, the method comprising:
    stacking the raw straw into a straw pile of 5 meters or higher in height;
    performing a first spray by spraying a spray solution on the straw, wherein the liquid volume in the first spray is controlled to such an extent that an aqueous solution flows out from the bottom of the pile;
    performing a second spray when the temperature of the pile reaches 70° C. and continues for 3-5 days;
    performing a third spray after 3-5 days of high temperature composting after the second spray; and
    spraying once every 3 to 5 days thereafter, so that a straw compost is prepared after 6-7 operations as such, wherein:
    the liquid volume in the second and later sprays is controlled to such an extent that the water content in the pile reaches 55-60%, and no more aqueous solution flows out from the bottom of the pile;
    the solution in the first spray is a solution formed by mixing a composting microbial solution with an aqueous amino acid solution at a volume ratio of 9:1;
    the solution in the second spray is a solution formed by adding, to the solution of the first spray, ammonium sulfate of 1-5% (W/V) based on the volume of the spray solution;
    the solution in the third and later sprays is 1-3% (W/V) aqueous ammonium sulfate solution +1% (W/V) aqueous potassium dihydrogen phosphate solution, in which the volume ratio (V/V) of the aqueous ammonium sulfate solution to the aqueous potassium dihydrogen phosphate solution is 1:1; and
    the composting microbial solution comprises composting microbe NJZ5 deposited in China General Microbiological Culture Collection Center (CGMCC) under CGMCC Accession No. 3309 on Sep. 22, 2009.

2. The method according to claim 1, wherein the aqueous amino acid solution is prepared by acidolysis by adding sulfuric acid to the lean meat of pigs died of illness, wherein the acidolysis comprises hydrolyzing the lean meat at 80-90° C. for 5-7 hrs with sulfuric acid having a concentration of 5-7 mol/L, and the material ratio of the lean meat to the 5-7 mol/L sulfuric acid is 1:1.5-2.5.

3. The method according to claim 1, wherein when the temperature of the pile reaches 70° C. and continues for 3-5 days after the first spray, a first turning is performed and then the second spray of the composting solution is performed immediately after the turning such that the water content in the composting material reaches 55-60%, upon which the composting temperature is 45-55° C., the pile temperature rises to 70° C. or higher again after 24 hrs and continues for 3-5 days, and then a second turning and the third spray of the composting solution are performed, so that the straw compost is prepared after 6-7 operations as such.

4. The method according to claim 3, wherein the turning is performed once every 3 to 8 days, and the spray is performed immediately after the turning, during the preparation of the straw compost.

5. The method according to claim 4, wherein the turning is performed once every 5 days and the spray is performed immediately after the turning, during the preparation of the straw compost.

6. The method according to claim 3, wherein upon turning, the composting material is exposed to oxygen fully by bringing it into contact with air for a period of time.

7. The method according to claim 1, wherein after the first spray, the liquid flowing out from the bottom of the pile is totally collected and recovered, and re-used in the second spray.

8. The method according to claim 1, further comprising a screening and packaging step after the preparation of the straw compost.

9. A straw organic fertilizer prepared according to the method as set forth in claim 1.

10. The method according to claim 4, wherein upon turning, the composting material is exposed to oxygen fully by bringing it into contact with air for a period of time.

11. The method according to claim 5, wherein upon turning, the composting material is exposed to oxygen fully by bringing it into contact with air for a period of time.

12. A straw organic fertilizer prepared according to the method as set forth in claim 2.

13. A straw organic fertilizer prepared according to the method as set forth in claim 3.

* * * * *